United States Patent [19]

Yubakami et al.

[11] Patent Number: 4,758,275

[45] Date of Patent: Jul. 19, 1988

[54] MAGNETIC FLUID

[75] Inventors: Keiichi Yubakami, Neyagawa; Mamoru Soga, Osaka; Nobuo Sonoda, Settsu; Wataru Shimotsuma, Ibaraki, all of Japan

[73] Assignee: Matsushita Electric Industrial Co., Ltd., Osaka, Japan

[21] Appl. No.: 330,851

[22] Filed: Dec. 15, 1981

[30] Foreign Application Priority Data

Dec. 19, 1980 [JP] Japan ................................ 55-180718

[51] Int. Cl.⁴ ................................ C09D 11/02

[52] U.S. Cl. ................................ 106/20; 106/22; 106/23; 252/62.55; 252/62.56

[58] Field of Search ................................ 106/20, 23, 22; 252/62.55, 62.56

[56] References Cited

U.S. PATENT DOCUMENTS

| | | | |
|---|---|---|---|
| 4,145,300 | 3/1979 | Hendriks | 252/62.1 |
| 4,218,530 | 8/1980 | Lu | 430/107 |
| 4,256,818 | 3/1981 | Blossey et al. | 252/62.56 |
| 4,259,368 | 3/1981 | Rudolf et al. | 256/62.56 |

*Primary Examiner*—Amelia Burgess Yarbrough
*Attorney, Agent, or Firm*—Stevens, Davis, Miller & Mosher

[57] ABSTRACT

This invention provides a magnetic fluid having a rich hue and containing an organic compound as dispersion medium.

The magnetic fluid of this invention is constructed by mixing, into a magnetic dispersion, a colorant prepared by beforehand treating a coloring material with a solubilizing treating agent or a dispersibilizing treating agent. Said solubilizing treating agent or dispersibilizing treating agent has a hydrophobic group and a functional group absorbable or linkable to said coloring material. As said coloring material, a dyestuff, an organic pigment or an inorganic pigment is used. A colorant prepared by subjecting an intermediate of said coloring material to said treatment is also usable. Further, a colorant prepared by pretreating a coloring material so as to give the coloring material an absorbability or a linkability to said solubilizing treating agent or dispersibilizing treating agent and then subjecting the beforehand pretreated coloring material to said treatment is also usable.

The magnetic fluid of this invention can retain its initial hue stably for a long period of time, and its hue can be changed without substantially changing the properties of magnetic fluid such as magnetization, viscosity and the like. Accordingly, the magnetic fluid of this invention can be applied extensively to all the use fields of magnetic dispersion, and it exhibits a particularly great effect when applied to uses of developer or ink in the field of printing and recording.

9 Claims, 1 Drawing Sheet

MAGNETIC FLUID

BACKGROUND OF THE INVENTION

This invention relates to an improvement of magnetic dispersion. Concretely, it relates to an improvement in the hue of magnetic dispersion.

The term "magnetic dispersion" means a liquid in which magnetic fine particles having a particle size of about 50–200 Å are dispersed in a dispersion medium by the aid of a surfactant. Such a magnetic dispersion has a characteristic property that it is stable for a long period of time, without precipitation nor agglomeration.

For the magnetic fine particle, fine particles of ferrite compounds such as magnetite, manganese ferrite, nickel ferrite, cobalt ferrite, iron zinc ferrite, manganese zinc ferrite, nickel zinc ferrite, barium ferrite and the like are in use. As a surfactant, carboxylic acids such as oleic acid, linoleic acid and the like, cationic surfactants, nonionic surfactants or the like are used either alone or in combination. As the dispersion medium, hydrocarbon compounds such as kerosene, toluene and the like, ester compounds such as ester oil and the like, ether compounds, fluorinated hydrocarbon compounds and the like are used either alone or in combination.

As a use for the magnetic dispersion, there can be mentioned a wide variety of uses including the uses in the mechanical field such as sealant, lubricant and the like; the uses in the field of separation such as an agent for gravity concentration, an agent for oil-water separation and the like; the uses in the field of printing and recording such as developer for magnetic or electrostatic latent image, ink for ink jet and the like; the uses in the field of toys; and so on.

Though the magnetic fluid of this invention can be employed in all the above-mentioned use fields of magnetic dispersion, it exhibits a particular usefulness in the field of printing and recording. Accordingly, in order to promote the understanding of the magnetic fluid of this invention, its application to the magnetic fluid recording process using a magnetic dispersion as an ink will be illustrated below. It is needless to say that the illustration lays down no unnecessary limitation on this invention.

Magnetic fluid recording process is a process for making records according to which the above-mentioned magnetic dispersion is used as an ink and a record is made by letting the ink fly, migrate or deflect by the action of pressure, magnetic force, Coulomb force or the like.

In this field, it has hitherto been proposed to use magnetic dispersion either as it is or after diluting it with a dispersion medium. The above-mentioned magnetic dispersion has had a drawback that, though it assumes a black or black-brown color usually, its hue changes when it is formed into a thin layer for making a record on a recording member or when it permeates into the recording member to form a record. The reason for this color change is believed to be as follows. The magnetic fine particles in the record image formed on a recording member are very small in number and the particle size of the magnetic fine particle used in magnetic dispersion is generally unsuitable for absorbing light having long wavelength. Thus, the hue of the record image has an increased redness as compared with the magnetic dispersion before recording and looks black-brown or light brown. Further, the hitherto known magnetic dispersion has had an additional drawback that, when it is used as an ink, the hue of the record made therefrom is limited to the color of the magnetic fine particle per se.

Accordingly, in order to form a record having a color other than a brownish color by using the magnetic dispersion as an ink, addition of a coloring material has been necessary.

Magnetic dispersion are roughly classified into magnetic dispersions using an organic dispersion medium which have a relation to this invention (hereinafter, they are referred to as "organic magnetic dispersions") and magnetic dispersions using water as dispersion medium (hereinafter, they are referred to as "aqueous magnetic dispersions").

They are not only different from each other in dispersion medium, but they are greatly different also in the construction of magnetic fine particle and surfactant. Thus, in the organic magnetic dispersion, the hydrophilic group of surfactant is adsorbed on magnetic fine particle so that the hydrophobic group of the surfactant is directed towards the dispersion medium. That is to say, surfactant forms a monolayer surrounding the magnetic fine particle. On the other hand, in aqueous magnetic dispersion, surfactant forms a double layer to surround a magnetic fine particle. That is to say, the hydrophobic group of the surfactant of the first layer is adsorbed on the magnetic fine particle, and the hydrophobic group of the surfactant of the first layer confronts the hydrophobic group of the surfactant of the second layer, so that the hydrophilic group of the surfactant of the second layer is directed towards the dispersion medium.

As compared with a micelle structure consisting only of one layer, this double layer structure is inferior in dispersion stability due to the weak adsorption force between the hydrophobic groups. Accordingly, if a physical, chemical or electrical action of electric field, strong flow, heat or the like is exercised thereupon, the magnetic particle in aqueous magnetic dispersion readily undergoes precipitation or agglomeration. Further, since the vapor pressure and viscosity of water are dependent only on temperature and humidity, the viscosity of aqueous magnetic dispersion is almost unchangeably fixed, only depending upon the temperature and the content of magnetic fine particle, so that the viscosity is quite difficult to control. Further, when it is used in an atmosphere having a low humidity, the water vaporizes rapidly so that the concentration of magnetic fine particle in the aqueous magnetic dispersion rises owing to the vaporization of the dispersion medium (water) (i.e. concentration) or precipitation of the magnetic fine particles can occur. Such concentration and precipitation of magnetic fine particles cause a change in the properties of the magnetic dispersion such as viscosity, electrical properties, magnetization and the like. Accordingly, if an aqueous magnetic dispersion is used as, for example, the ink for ink jet, clogging of the nozzle readily takes place. Further, in the general magnetic fluid recording process, the conditions of flying, migration or deflection of ink readily change, which has been an important problem in continuing the recording for a long period of time or using the ink (aqueous magnetic dispersion) after a longterm standing. Further, as compared with organic magnetic dispersion, an aqueous magnetic dispersion has a lower electric resistance, so that it is difficult to use in the magnetic fluid recording process wherein a magnetic dispersion is let fly only by the action of Coulomb force obtained by applying a voltage, because the applied voltage leaks and produces no Coulomb force. Further, an aqueous magnetic dispersion cannot be used as a lubricant because water is used as dispersion medium in it. Further, as compared with the case of organic magnetic dispersion, aqueous magnetic dispersion is inferior in dispersion stability and the vaporization speed of dispersion medium and the viscosity are more difficult to control, so that the use of the aqueous magnetic dispersion is quite limited among the above-mentioned use fields of magnetic dispersions. Mainly, the possibility of utilizing it as an ink for ink jet using deflection by magnetic field is being discussed.

Although aqueous magnetic dispersion has an advantage that, owing to the use of water as dispersion medium, its hue can be changed easily by mixing a number of coloring materials (particularly dyestuffs) thereinto, it has many drawbacks mentioned above which are a great obstacle to the use of aqueous magnetic dispersions.

On the other hand, the organic magnetic dispersion relating to this invention is excellent in the dispersion stability of magnetic fine particles, as has been mentioned above. Accordingly, it keeps stable against the physical, chemical or electrical actions of electric field, strong flow, heat or the like. Further, with regard to vapor pressure of dispersion medium it still has an advantage that a dispersion medium having a vapor pressure suitable for the environment of use can easily be selected and used. That is, a dispersion medium having a larger number of carbon atoms can be used as a dispersion medium having a lower vapor pressure, and a dispersion medium having a smaller number of carbon atoms can be used as a dispersion medium having a higher vapor pressure. Further, by using a mixture of organic compounds different in carbon number as a dispersion medium, vapor pressure can be controlled more minutely and viscosity of magnetic dispersion can also be controlled so as to meet the purpose of use.

For these reasons, an organic magnetic dispersion has a merit that the problems due to vaporization of dispersion medium which caused concentration and precipitation of magnetic fine particles are much less than in the case of an aqueous magnetic dispersion. Accordingly, for example, the clogging of nozzle in ink jet takes place less easily than in the case of aqueous magnetic dispersion and the conditions of flying, migrating and deflecting of magnetic fluid less readily change than in the other case even in the general magnetic fluid recording process, so that a stable record can be obtained when used in a longterm continuous recording or in a recording after a longterm standing of ink. Further, since organic magnetic dispersion is generally higher than aqueous magnetic dispersion in electric resistance, it can be used in extensive recording processes including the magnetic fluid recording process according to which a voltage is applied and a magnetic dispersion is let fly only by the action of Coulomb force. Further, organic magnetic dispersion can be extensively used not only in the fluid of printing and recording but also in all the above-mentioned uses of magnetic dispersions, so that its industrial utilization is much higher than that of aqueous magnetic dispersion.

However, the hue of organic magnetic dispersion is quite difficult to change, which has been an important drawback of organic magnetic dispersion.

That is, the hitherto well known coloring materials cannot readily dissolve nor disperse into organic magnetic dispersions. Therefore, changing the hue of a magnetic dispersion has been possible hitherto only by sufficiently diluting the magnetic dispersion with a dispersion medium and then mixing coloring materials thereinto. On the other hand, the magnetization of magnetic dispersion is approximately proportional to the content of magnetic fine particle in magnetic dispersion. Accordingly, if the hue of a magnetic dispersion is changed by the prior art measure in the above-mentioned manner, namely by sufficiently diluting the magnetic dispersion with a dispersion medium and then mixing coloring materials thereinto, its magnetization becomes extremely low and, in some extreme cases, the response to magnetic field is hampered so that the magnetic characteristics of a magnetic dispersion can be lost substantially. In other words, there has been a drawback that an intention to change the color of magnetic dispersion results in damaging its magnetic characteristics, and inversely, an intention to maintain its magnetic characteristics results in impossibility of changing the color. Further, if pigment particles having a form of colloidal particle are merely mixed into an organic magnetic dispersion, said pigment particles gradually agglomerate and then precipitate so that a stable magnetic dispersion capable of retaining its hue for a long period of time cannot be obtained.

An object of this invention to provide a magnetic fluid containing organic compounds as the dispersion medium, excellent in magnetic characteristics, and having a rich and stable color.

The object of this invention can be achieved by using a magnetic fluid formed by mixing an organic magnetic dispersion with a colorant prepared by previously treating a coloring material with a solubilizing treating agent or a dispersibilizing treating agent.

DETAILED EXPLANATION OF THE INVENTION

Figure 1:
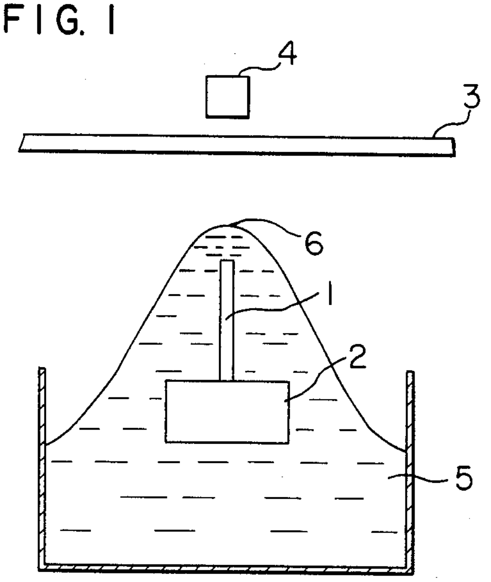
FIG. 1 is a lateral sectional view illustrating the principle of a magnetic fluid recording apparatus using the magnetic fluid of this invention as an ink.

The magnetic fluid of this invention is characterized by being constructed of a mixture consisting of an organic magnetic dispersion and a colorant previously treated with a solubilizing treating agent or a dispersibilizing treating agent. As the characteristics required, the following two points are of main importance:

(1) The colorant should be soluble or stably dispersible in the dispersion medium.

(2) The colorant should not exercise any effect on the dispersion stability of magnetic fine particles.

Now, in order to satisfy the above-mentioned two demands, it is necessary that any one member selected from a coloring material, an intermediate of a coloring material and a pretreated coloring material is subjected to a solubilizing treatment or a dispersibilizing treatment (hereinafter, these two treatments will be generically referred to as "treatment") to obtain a colorant and said colorant is mixed, dissolved or dispersed into a magnetic dispersion and that neither the solubilizing treating agent nor the dispersibilizing treating agent (hereinafter, these two agents will be generically referred to as "treating agent") exercises any interaction upon the surfactant of the magnetic fine particle.

Said treating agent may be any compound so far as it has a hydrophobic group miscible with the dispersion medium of the magnetic dispersion and a functional group adsorbable or linkable to the coloring material, intermediate of coloring material or pretreated coloring material.

As said treatment, the following two methods can be referred to. One of them is a method of letting a coloring material adsorb said treating agent, and the other is a method of linking a coloring material to said treating agent. Said coloring material may be of any coloring material so far as it has a group adsorbable or linkable to the above-mentioned functional group of treating agent. A pretreated coloring material which has been subjected to a pretreatment to attach said group to the coloring material, as well as an intermediate of coloring material having said group, can also be used for the purpose.

On the other hand, oil-soluble dyes commercially available as oil-soluble dye generally have a low solubility in the dispersion medium, so that a mere mixing of said oil-soluble dye is not enough to change the hue of magnetic dispersion. Accordingly, it is recommendable, in order to achieve the object of this invention, to solubilize or dispersibilize such oil-soluble dyes by subjecting them to any of the above-mentioned treatments, even if they are usually commercially available oil-soluble dyes.

As used herein, the term "solubilizing treatment" means a treatment by which the treated coloring material (i.e. the colorant) becomes dispersible in the form of molecule into the dispersion medium. The term "dispersibilizing treatment" means a treatment by which the treated coloring material (i.e. the colorant) becomes dispersible in the form of particle into the dispersion medium. In this case, since a smaller particle size of colorant can enhance the dispersion stability, it is most desirable to disperse the colorant in the colloidal form. Additionally, the solubilizing treatment and the dispersibilizing treatment are not clearly distinguishable from each other in some cases.

By mixing a colorant prepared by the above-mentioned treatment into a magnetic dispersion in an appropriate proportion, there can be obtained an organic magnetic fluid different in hue from the magnetic dispersion. If the magnetic fluid is allowed to stand for several months, there are observed no changes such as separation, agglomeration and precipitation of magnetic fine particle or colorant.

Next, the materials used in this invention will be explained, provided that the materials mentioned below are no more than one example thereof and this invention is by no means limited by these examples. As examples of the dye among the coloring materials, there can be referred to basic dyes such as C. I. Basic Red 9, C. I. Basic Blue 24 and the like; acid dyes such as C. I. Acid Blue 43, C. I. Acid Blue 78, C. I. Acid Violet 41 and the like; azoic dyes such as C. I. Azoic Diazo Component 31, C. I. Azoic Diazo Component 34, C. I. Azoic Diazo Component 35 and the like; oil-soluble dyes such as C. I. Solvent Yellow 6, C. I. Solvent Yellow 61, C. I. Solvent Yellow 80, C. I. Solvent Orange 2, C. I. Solvent Orange 37 and the like; and so on. As examples of organic pigment among pigments, there can be referred to C. I. Pigment Yellow 5, C. I. Pigment Yellow 11, C. I. Pigment Yellow 15, C. I. Pigment Red 50, C. I. Pigment Red 51, C. I. Pigment Red 53, C. I. Pigment Blue 1, C. I. Pigment Blue 2 and the like; as well as metallo phthalocyanines, non-metallo phthalocyanines and the like. As examples of inorganic pigment, cobalt blue, ultramarine blue, Prussian blue, cerulean blue, manganese blue, tungsten blue, red oxide, red lead oxide, molybdenum red, cobalt red, carbon black and the like can be referred to.

Apart from them, the intermediates of coloring materials to which a linkage (mentioned later) is to be attached in the subsequent solubilizing or dispersibilizing treatment, such as C. I. Acid Red 32, C. I. Acid Red 35, C. I. Acid Red 37 and the like, can also be used. Further, coloring materials into which the treating agents mentioned below have been introduced in the oil-solubilizing treatment of oil-soluble dye can also be referred to.

Thus, said treating agent may be any compound so far as it has a hydrophobic group and a functional group adsorbable or linkable to coloring material. Concrete examples of said hydrophobic group include alkyl groups, cycloalkyl groups, alkenyl groups, aralkyl groups and the like, among which groups having 10–30 carbon atoms are preferable and those having 12–20 carbon atoms in their main chain are particularly preferable. As examples of the functional group adsorbable or linkable to coloring material, there can be referred to carboxyl group, carboxylic acid anhydride group, carbonyl chloride group, carbonyl bromide group, sulfonic acid group, sulfonyl chloride group, primary amino group, secondary amino groups, phenyl group and the like.

Next, the dispersion medium will be explained. As the organic dispersion medium relating to the magnetic fluid of this invention, hydrocarbon compounds, ether compounds, ester compounds and fluorinated hydrocarbon compounds can be referred to. Among the above-mentioned organic dispersion media, hydrocarbon compounds are most preferably utilized as the dispersion medium for magnetic dispersion, and such a magnetic dispersion is most readily available. Accordingly, the magnetic fluid of this invention is preferably a magnetic fluid in which a hydrocarbon compound is used as dispersion medium. Dispersion media consisting of hydrocarbon compound are roughly classified into aromatic hydrocarbon compounds such as toluene and the like and aliphatic hydrocarbons such as kerosene and the like. Though aromatic hydrocarbon compounds are generally superior to aliphatic hydrocarbon compounds in solubility, many of them have toxicity problems and they are narrow in the range of vapor pressure and viscosity. On the other hand, aliphatic hydrocarbon compounds have favorable physical properties for practical use, such as low vapor pressure and low viscosity, and their toxity is generally low. Accordingly, aliphatic hydrocarbon compounds are more industrially advantageous. Unlike the hitherto known coloring materials difficult to dissolve into aliphatic hydrocarbon compounds, the colorants used in the magnetic fluid of this invention are readily soluble or dispersible into aliphatic hydrocarbon compounds. In view of the above-mentioned points, aliphatic hydrocarbon compounds are preferable as the dispersion medium for the magnetic fluid of this invention. Further, taking vapor pressure and viscosity into consideration, the use of aliphatic hydrocarbon compound having 8–20 carbon atoms either alone or in the form of mixture is most preferable and most extensively employable.

Next, the treatment will be explained.

In organic magnetic dispersions, a surfactant forms a monolayer surrounding the magnetic fine particles, as has been mentioned above. If an excessive amount of surfactant is added thereto, the excessive surfactant forms double layer surrounding the magnetic fine particles, so that dispersion stability of the magnetic fine particles is injured and the magnetic fine particles precipitate. Since many of the functional groups adsorbable or linkable to coloring material, present in the treating agent, are polar as mentioned above, mixing of the treating agent into a magnetic dispersion results in an injury to the dispersion stability of magnetic fine particles and a precipitation of magnetic fine particles, as mentioned above. Further, it is said that a chemical adsorption takes place between the magnetic fine particles and the surfactant. Thus, if the magnetic dispersion is heated to a temperature of, for example, about 200° C., the adsorbing force between the magnetic fine particles and the surfactant decreases due to the thermal stimulation and the dispersion stability of the magnetic fine particles is injured. For the reasons mentioned above, a mere mixing of a magnetic dispersion, a treating agent and a coloring material with a treatment such as stirring, heating or the like only causes a meaningless decrease in the dispersion stability of magnetic fine particles, and hue of the magnetic dispersion cannot be changed by such a procedure. Accordingly, a magnetic fluid different from the magnetic dispersion in hue can be obtained without injuring the dispersion stability of magnetic fine particles only by mixing, into the magnetic dispersion, a colorant prepared by beforehand subjecting a coloring material to a treatment.

Now, the treatment of coloring material can roughly be classified into adsorption and linkage formation, as has been mentioned above. Although said adsorption is considered a chemical or ionic adsorption between the polar group of the coloring material and the functional group of treating agent, it is not yet elucidated. As examples of the linkage formed, covalent bond linkages such as amide linkage, sulfonamide linkage, N-alkyl linkage, ester linkage, acyl linkage and the like can be referred to. Apart from them, ionic linkages are also considered participating therein, though it is unknown whether the actual state is an ionic adsorption or an ionic linkage.

The treatment mentioned above is concerned with the case when the coloring material has a polar group. As other means, there can be referred to a method which comprises beforehand subjecting a coloring material to a pretreatment and then letting a treating agent link or be adsorbed thereto, and a method which comprises letting a treating agent link to an intermediate of coloring material. As examples of the method of the pretreatment, amination, hydroxylation and carboxylation of coloring material, conversion of the carboxy group of coloring material to carbonyl chloride or carbonyl bromide, and the like can be referred to. The term "intermediate of coloring material" used herein means, for example in the case of a coloring material to be synthesized via a reaction such as amidation or the like, the compound before the above-mentioned reaction. Accordingly, the synthesis can be achieved by linking, to said intermediate of coloring material, a treating agent having a functional group favorable to the synthesis of said coloring material which has been selected from the group consisting of the treating agents of this invention. At this time, the reaction can be carried out under roughly the same conditions as in the synthesis of the coloring material and the reaction itself is a quite usual reaction, so that the treatment can be practised easily.

When a pigment is used as the coloring material, it is recommendable to carry out the treatment by introducing the pigment together with a treating agent into ball mill, attritor, sand grinder or the like. In the case of some inorganic pigments which can be synthesized by the salting out process from a solution state, i.e. by the so-called wet method, it is recommendable to carry out the dispersibilizing treatment by adding a treating agent at the time of producing the pigment.

As has been mentioned above, the treating agent generally has a polarity. Therefore, the unadsorbed or unlinked treating agent decreases the dispersion stability of the magnetic fine particles. Accordingly, it is preferable to carry out the treatment by using the treating agent in an amount just capable of being adsorbed or linked to the coloring material.

Next, the method for mixing a colorant into a magnetic dispersion will be explained. As has been mentioned above, the colorant of this invention is a coloring material which has been solubilized or dispersibilized beforehand, and it exercises no influence on the dispersion stability of magnetic fine particles. Accordingly, the method for mixing the colorant into the magnetic dispersion may be a very simple conventional means such as stirring, ultrasonic treatment or the like.

Next, the mixing ratio between colorant and magnetic dispersion and the change in hue will be explained. The magnetic fluid of this invention assumes a color which is a mixed color consisting of the color of the magnetic fine particle itself and the color of the colorant itself. Accordingly, the relation between said mixing ratio and the hue is nothing other than the relation between the mixing ratio of magnetic fine particle to colorant and the change in hue. Further, it is natural that a higher mixing ratio of colorant to magnetic fine particle gives a color of magnetic fluid closer to the color of colorant. On the other hand, since the hue of magnetic fluid is dependent on the kind and size distribution of magnetic fine particle as well as on the kind, solubility or dispersibility, molar absorptivity or hiding power, and size distribution (in the case of dispersibilized colorant) of colorant, it is difficult to mention, as a general rule, the correlation between the mixing ratio of magnetic fine particle to colorant and the hue of magnetic fluid. Now, there always exists a saturated concentration in solid-liquid mixture systems, and the system of magnetic fine particle, colorant and dispersion medium in the magnetic fluid of this invention is not exceptional. That is, when the kind of magnetic fine particle, its size distribution, its content in dispersion medium and the kind of dispersion medium are fixed, the maximum content of colorant in this magnetic dispersion is determined depending on the kind, solubility or dispersibility, particle size distribution (in the case of dispersibilized colorant) and the like. That is, in the fixed magnetic dispersion, there exists an upper limit in the effective mixing ratio of colorant to magnetic fine particle. For convenience, this upper limit of mixing ratio is defined as a saturated mixing ratio of colorant. In order to mix a colorant into a magnetic dispersion in excess of said saturated mixing ratio, it is necessary to dilute the magnetic dispersion and thereby to enhance the mixing ratio of the colorant. As has been mentioned above, the magnetization of a magnetic dispersion is roughly proportional to the content of magnetic fine particle. Accordingly, the magnetization of the magnetic fluid of this invention is also roughly proportional to the content of magnetic fine particle. Therefore, the magnetization in a magnetic fluid in which the mixing ratio of colorant exceeds the saturated mixing ratio is lower than the magnetization in a magnetic fluid in which the mixing ratio of colorant is smaller than the saturated mixing ratio. Since said saturated mixing ratio varies depending on the kind or particle size of magnetic fine par particle, solubility or dispersibility and particle size distribution (in the case of dispersibilized colorant) of colorant and the kind of dispersion medium, it cannot be discussed uniformly as a specified value. In the magnetic fluid of this invention, the mixing ratio of colorant can be selected in the range not injuring the magnetic characteristics meeting the aimed use. As has been mentioned above, the prior technique has a drawback that an intention to change the color of magnetic dispersion results in an injury to magnetic characteristics and inversely an intention to maintain the magnetic characteristics results in impossibility of changing the color of magnetic dispersion. In contrast to it, the colorant contained in the magnetic fluid of this invention has an excellent solubility or dispersibility and exercises no influence upon the dispersion stability of magnetic fine particle, so that a magnetic fluid having a high mixing ratio of colorant to magnetic fine particle can be provided without injuring the magnetic characteristics of magnetic fluid. In other words, magnetic fluids of high magnetization having various hues can be obtained easily. Further, according to this invention, the contents of magnetic fine particle and colorant in magnetic fluid can be made high. Therefore, concentration of a magnetic fluid having an effective hue or effective magnetic characteristics can be controlled in a wide range. That is, this invention has an effect that a magnetic fluid having a lower viscosity can easily be obtained by diluting a magnetic fluid with a dispersion medium having a low viscosity or a magnetic fluid having a higher viscosity can easily be obtained by concentrating a magnetic fluid or diluting it with a dispersion medium having a high viscosity, so that the scope of its use can be expanded.

Further, since the magnetic fluid of this invention can be obtained by mixing a magnetic dispersion and a colorant by a simple and conventional method, it can easily be produced by mass-production.

Further, plural kinds of colorants may be added to the magnetic fluid of this invention. Accordingly, minute control of the hue of the magnetic fluid can be practised easily.

Next, concrete examples of this invention will be mentioned below, provided that this invention is by no means limited by the examples mentioned below.

First, colorants were prepared by the treatments of A to G. In some colorants where the treatment is referred to only as "treatment", it is not known whether the treatment was solubilizing treatment or dispersibilizing treatment.

(Colorant A)

Coloring material: Mihara Oil Blue (manufactured by Mihara Kako Co., Ltd.)

Treatment: Oleic acid and the dyestuff were mixed at a ratio of 23 : 10 by weight and stirred at room temperature.

Color of the colorant: Blue (Colorant B)

Coloring material: Intermediate of C. I. Acid Red 32

Solubilizing treatment:

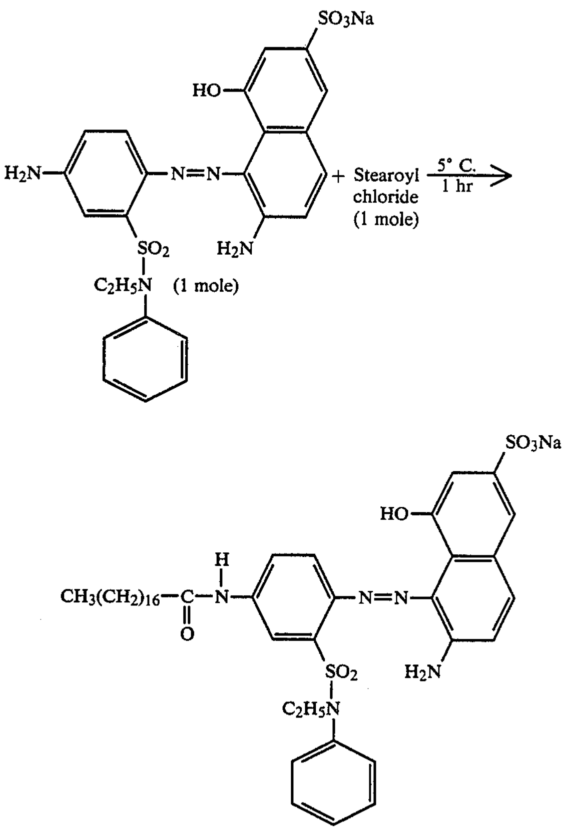

Color of the colorant: Red (Colorant C)

Coloring material: C. I. Pigment Violet 19

Dispersibilizing treatment: A mixture consisting of 150 g of the Pigment, 55 g of anhydrous stearic acid and 500 ml of kerosene was dispersed for 5 days in a sand grinder at 1,600 rpm.

Color of the colorant: Reddish violet (Colorant D)

Coloring material: C. I. Solvent Blue 11

Treatment: A mixture consisting of 310 g of the dyestuff, 570 g of oleic acid and 500 ml of petroleum ether was stirred at room temperature and then the petroleum ether was removed by distillation.

Color of the colorant: Blue (Colorant E)

Coloring material: C. I. Solvent Blue 11

Dispersibilizing treatment: A mixture consisting of 310 g of the dyestuff, 1,100 g of stearoyl chloride and 5,000 cc of toluene was reacted at 80° C. for 2 hours and then the toluene was removed by distillation.

Color of the colorant: Red (Colorant F)

Coloring material: C. I. Pigment Violet 1

Pretreatment: 4 Moles of the dyestuff was reacted with 1 mole of thionyl chloride.

Dispersibilizing treatment: A mixture consisting of 50 g of the pretreated dyestuff, 9 g of octadecylbenzene and 120 ml of nitrobenzene was reacted at 100° C. for 6 hours and then the nitrobenzene was removed by distillation.

Color of the colorant: Violet (Colorant G)

Coloring material: Cobalt blue

Dispersibilizing treatment: Cobalt blue was synthesized by wet method according to the procedure mentioned in an article written by Seishiro Ito, Tadahiro Ohkawa and Toshihide Kuwabara: Shikizai (Coloring material), 54, 339–343 (1981) and its particle size was adjusted to 200 Å, after which an appropriate amount of oleic acid was added and the resulting mixture was extracted into kerosene layer.

Color of the colorant: Blue

Each of the colorants A to G subjected to the above-mentioned treatment was mixed into magnetic dispersions manufactured by Matsumoto Yushi Seiyaku Co., Ltd. mentioned in Table 1. In Table 1, the hue of the magnetic dispersions alone are also listed.

TABLE 1

| No. | Magnetic fine particle | Composition | Hue |
|---|---|---|---|
| H | Magnetite | $FeO.Fe_2O_3$ | Blackish light brown |
| I | Iron zinc ferrite | $(Fe_{0.7}Zn_{0.3})O.Fe_2O_3$ | Blackish light brown |
| J | Manganese zinc ferrite | $(Mn_{0.7}Zn_{0.3})O.Fe_2O_3$ | Blackish brown |

In Table 1, the compositions express the analyses of magnetic fine particles at the time of their production.

In all cases, the used dispersion media are kerosene.

Next, as examples, colorants A to G were mixed into magnetic dispersions H to J in the proportions shown in Table 2 to obtain magnetic fluids. In Table 2, the mixing ratios are expressed by ratio (by weight) of colorant to magnetic fine particle.

The mixing may be carried out by conventional simple method such as agitating with a stirrer, ultrasonic dispersion for 20–40 minutes, or the like.

In Table 3, comparative examples are shown where coloring material before treatment were mixed into the same magnetic dispersions as in the examples mentioned in Table 2. In order to compare this invention with prior technique, the example numbers in Table 3 are selected so as to correspond to the example numbers in Table 2 with regard to mixing ratio of colorant to magnetic dispersion. That is, Example No. 1 of Table 2 corresponds to Comparative Example No. 1' of Table 3. Similarly, Example Nos. 2, 6 and 7 in Table 2 correspond to Comparative Example Nos. 2', 6' and 7' in Table 3, respectively.

In any of the magnetic fluids mentioned in examples and comparative examples, magnetic dispersion and colorant were mixed, the mixture was allowed to stand for 24 hours and then the filtrate was used as sample.

TABLE 2

| Example No. | Mixing ratio (by weight) | Hue |
|---|---|---|
| 1 | A:H = 1:6 | Bluish black |
| 2 | A:J = 1:5 | Bluish green |
| 3 | B:I = 2:5 | Brownish red |
| 4 | C:H = 2:5 | Dark green |
| 5 | C:J = 2:5 | Dark green |
| 6 | D:J = 1:5 | Greenish black |
| 7 | D:H = 1:5 | Bluish black |
| 8 | E:H = 1:5 | Brownish red |
| 9 | F:H = 1:4 | Dark green |
| 10 | G:E:I = 2:1:10 | Black |

TABLE 3

| Comparative Example No. | Coloring material | Magnetic dispersion | Hue |
|---|---|---|---|
| 1' | Mihara Oil Blue | H | Blackish light brown |
| 2' | Mihara Oil Blue | J | Blackish brown |
| 6' | C. I. Solvent Blue 11 | J | Blackish brown |
| 7' | C. I. Solvent Blue 11 | H | Blackish light brown |

The magnetic fluids shown in Tables 2 and 3, thus prepared, were used as inks. Thus, after adjusting their viscosities to about 6 c.p., they were let fly onto a recording paper by means of the magnetic fluid recording apparatus shown in FIG. 1 and FIG. 2. The hues observed are shown in Tables 2 and 3.

Figure 2:
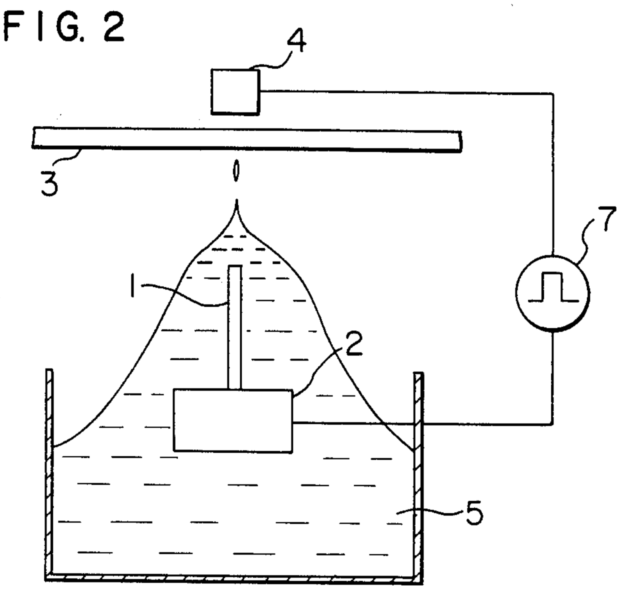
FIG. 2 is a lateral sectional view illustrating its recording state.

Here, the magnetic fluid recording apparatus will be explained briefly. As shown in FIG. 1, its main part is so constructed that one end of stylus 1 is contacted with magnetic 2 and the other end of stylus 1 confronts electrode 4 through intermediation of recording paper 3. Owing to the magnetic field of magnet 2, ink 5 runs along stylus 1 and protrudes at its tip. Then, a voltage 7 (recording voltage) corresponding to image signal is applied between stylus 1 and electrode 4, as shown in FIG. 2, and the ink 5 flies from the tip of protrusion 6 owing to Coulomb force. Thus, a record corresponding to the image signal is formed on recording paper 3.

When the magnetic fluids of Table 2 were left standing for several months and then examined, no separation, agglomeration nor precipitation was observed on magnetic particles and colorant. Further, after the standing for several months, the recording experiment with the magnetic fluid recording apparatus was carried out in the same manner as above. Thus, no change was observed in the hue of ink.

When ether type, ester type or fluorinated hydrocarbon type of dispersion medium was used, the magnetic fluid obtained therefrom still gave the same effect as above.

By comparing the results shown in Tables 1, 2 and 3, it is understandable that a change in hue has doubtlessly taken place in the magnetic fluids of this invention.

In the description given above, the use of the magnetic fluid of this invention in magnetic fluid recording apparatus shown in FIGS. 1 and 2 was mentioned as one example of its uses. However, its use is not limited to the use in said recording apparatus, but it can also be used as, for example, inks for ink jet, ball point pen or the like, of course.

Further, the magnetic fluid of this invention can also be used extensively in all the use fields of magnetic dispersion other than printing and recording.

As above, this invention provides a novel magnetic fluid, namely a magnetic dispersion which has been made richer in hue.

What is claimed is:

1. A liquid magnetic fluid comprising:

a magnetic dispersion perpared by dispersing magnetic fine particles having a particle size of 50 to 200 into an organic dispersion medium with the aid of a surfactant; and a colorant formed by treating a coloring material with a solubilizing treating agent of a dispersibilizing treating agent, said solubilizing or dispersibilizing treating agent having a hydrophobic group which is at least one member selected from the group consisting of alkyl of at least 10 carbon atoms, cycloalkyl, alkenyl or aralkyl group, and said solubilizing or dispersibilizing treating agent further having a functional group adsorbable or linkable to the coloring material, selected from the group consisting of carboxyl, carboxylic acid anhydride, carbonyl, carbonyl bromide, sulfonic acid, sulfonyl chloride, primary amino, secondary amino and phenyl groups.

2. A magnetic fluid according to claim 1, wherein said magnetic fine particle is a ferrite compound and said organic dispersion medium is at least one member selected from the group consisting of hydrocarbon compounds, ether componds, ester compounds and fluorinated hydrocarbon compounds.

3. A magnetic fluid according to claim 2, wherein said hydrocarbon compound is at least one aliphatic hydrocarbon compound having 8–20 carbon atoms.

4. A magnetic fluid according to claim 1 or claim 2, wherein said coloring material is a coloring material which has been pretreated by at least one reaction selected from the group consisting of amination, carboxylation, hydroxylation, conversion of carboxyl group to carbonyl chloride and conversion of carboxyl group to carbonyl bromide.

5. A magnetic fluid according to claim 1 or claim 2, wherein said coloring material is an intermediate of coloring material.

6. A magnetic fluid according to any of claim 1 and claim 2, wherein the linkage between the solubilizing treating agent or dispersibilizing treating agent and the coloring material is at least one member selected from the group consisting of amide linkage, sulfonamide linkage, ester linkage, N-alkyl linkage and acyl linkage.

7. A magnetic fluid according to claim 1, wherein said alkyl of at least 10 carbon atoms is from 10 to 30 carbon atoms.

8. A magnetic fluid according to claim 7, wherein said alkyl has 12 to 20 carbon atoms in the main chain.

9. A magnetic fluid according to claim 1, wherein said colorant does not affect the dispersibility of said magnetic fine particles.

* * * * *